United States Patent [19]

Kuznicki et al.

[11] Patent Number: 4,603,040

[45] Date of Patent: Jul. 29, 1986

[54] MASSIVE BODIES OF MAXIMUM ALUMINUM X-TYPE ZEOLITE

[75] Inventors: Steven M. Kuznicki, Allentown; Charles G. Coe, Macungie; Richard J. Jenkins, Coopersburg; Stephen A. Butter, Allentown, all of Pa.

[73] Assignee: Air Products and Chemicals, Inc., Allentown, Pa.

[21] Appl. No.: 716,429

[22] Filed: Mar. 27, 1985

[51] Int. Cl.$^4$ .............................................. C10B 33/28
[52] U.S. Cl. .................................... 423/328; 423/329; 423/118
[58] Field of Search ........................ 423/328, 329, 118

[56] References Cited

U.S. PATENT DOCUMENTS

| | | | |
|---|---|---|---|
| 3,114,603 | 12/1963 | Howell | 23/113 |
| 3,119,660 | 1/1964 | Howell et al. | 23/112 |
| 3,338,672 | 8/1967 | Haden, Jr. et al. | 423/329 |
| 3,359,068 | 12/1967 | Michalko | 23/112 |
| 3,386,802 | 6/1968 | Michalko | 23/112 |
| 3,394,989 | 7/1968 | Drost | 23/112 |
| 3,459,501 | 8/1969 | Plank | 23/112 |
| 3,773,391 | 5/1973 | Hoffman | 423/118 |
| 3,906,076 | 9/1975 | Goyhsolo et al. | 423/118 |
| 4,289,740 | 9/1981 | Estes | 423/328 |
| 4,406,823 | 9/1983 | Laurent et al. | 423/329 |
| 4,407,782 | 10/1983 | Estes | 423/328 |

FOREIGN PATENT DOCUMENTS 0043221 11/1965 German Democratic Rep.
0058957 12/1967 German Democratic Rep.
1580928 12/1980 United Kingdom.

Primary Examiner—John Doll
Assistant Examiner—Lance Johnson
Attorney, Agent, or Firm—Mark L. Rodgers; E. Eugene Innis; James C. Simmons

[57] ABSTRACT

Maximum Aluminum X-type zeolite is prepared in the form of essentially binderless aggregates. In the optimal case, the composition possesses the maximum theoretical zeolite cation content in a wide-pored zeolite as a solid, massive body.

6 Claims, No Drawings

MASSIVE BODIES OF MAXIMUM ALUMINUM X-TYPE ZEOLITE

FIELD OF THE INVENTION

This invention relates to massive bodies of molecular sieve zeolite and the manufacture thereof. More particularly, this invention is directed to Maximum Aluminum X-type zeolite bodies which possess utility in the areas of selective adsorption, ion exchange and catalysis.

BACKGROUND OF THE INVENTION

Molecular sieve zeolites have demonstrated substantial utility in a wide variety of adsorptive, catalytic and ion exchange processes. Owing to engineering considerations, the physical form in which the zeolites are employed may exert a profound influence on the efficiency of a given process. While considerable effort in the prior art has been devoted to the preparation of various zeolite bodies in forms suitable for fixed bed or fluidized bed applications, no such reports of massive bodies of Maximum Aluminum X-type zeolite are known. Maximum Aluminum X-type zeolite is the only known wide pored (about 8Å) zeolite available in this form possessing an idealized 1:1 silica/alumina ratio. For this and perhaps other reasons, it demonstrates a variety of unique and desirable properties.

U.S. Pat. No. 3,119,660 teaches the preparation of massive bodies of molecular sieve zeolites by the in situ conversion of meta kaolin or meta kaolin/silica aggregates. Using these meta kaolin aggregates as the silica-alumina source, standard chemical formulations are shown (as described in U.S. Pat. No. 3,114,603) to facilitate the conversion of meta kaolin to massive bodies of high purity (>90%) zeolite A. U.S. Pat. No. 3,119,660 further teaches that zeolites with elevated Si/Al ratios may be prepared by the conversion of meta kaolin aggregates whose silica content has been fortified by the addition of a supplemental silica source. The preparation of the faujasite type zeolites X and Y are specifically demonstrated using these techniques.

An alternate method of preparation of massive bodies of zeolite is disclosed in U.S. Pat. No. 3,359,068 wherein preformed, calcined aggregates derived from a silica gel are reacted in situ with appropriate alkali-metal-aluminate solutions. Such compositions are said to demonstrate superior adsorptive properties when compared with their classically prepared counterparts. The analogous technique of the in situ conversion of preformed aggregates derived from an alumina hydrosol by contact with the appropriate alkali-metal-silicate is taught by U.S. Pat. No. 3,386,802.

Other variations on the preparation of selfbound zeolite aggregates included the preparation of classically bound zeolite extrusions wherein the binders are further converted to zeolite. For example Zeolite A (as reported in U.S. Pat. No. 3,395,989) or Zeolite X (as reported in U.S. Pat. No. 3,906,076) may be bound with meta kaolin and this binding phase subsequently converted to zeolite by known methods.

The prior art relating to the preparation of faujasites has centered on the elevation of the Si/Al ratio by either imparting aluminum deficiency on clays by techniques such as acid leaching, as taught in U.S. Pat. No. 3,733,391, or using high silica hydrols, as taught in U.S. Pat. No. 3,459,501 as the starting reactants.

In no case is the preparation of Maximum Aluminum X-type zeolite in the form of massive bodies disclosed.

Zeolites span a wide range of aluminum contents from the maximum allowable, according to the rule of Lowenstein (i.e. Si/Al = 1.0), as in the case of Zeolite A, to virtually zero as in the case of Silicalite.

Faujasite-type zeolites are defined as those zeolites with a framework topography resembling the mineral faujasite. Such species are characterized by a relatively open zeolite framework with large (about 8Å) pores and high (nearly 50%) void volumes. Synthetic faujasites are generally subdivided into zeolites X and Y by virtue of their silica content; zeolite Y being defined as Si/Al≧1.5, zeolite X being defined as Si/Al<1.5. While zeolites X and Y represent a relatively smooth continuum of Si/Al ratio of the faujasite structure over a broad range, a discontinuity appears when the Si/Al ratio is lowered to about 1.2. Extrapolation of standard synthesis techniques for Zeolite X will not produce faujasites below this boundary. As reviewed in U.S. Pat. No. 4,289,740 and 4,407,782, studies of the variability of Si/Al ratios of faujasites terminate at this lower boundary and X zeolite with increased alumina (e.g., Si/Al = about 1) has been referred to as "idealized".

Such a 1:1 Si/Al faujasite may not only be viewed as idealized from the perspective of its unavailability, but also from a structural perspective. Such a species would demonstrate perfect uniformity in alternating silica-alumina groups with concomitant perfect uniformity in pore geometries and high homogeneity in adsorption and catalytic sites.

Little mention of the preparation of an "idealized" 1:1 Si/Al faujasite in the powder form is to be found in the prior art, and none is known relating to the preparation of such a species in the form of massive bodies.

In U.S. Pat. No. 4,289,740 and 4,407,782, a zeolite is prepared by aging and then reacting various alumino-silicate mixtures at extreme pressure, typically 50,000 psi. This zeolite, called HP, is claimed to violate the rule of Lowenstein and demonstrate a Si/Al<1 ratio with a faujasite type structure. However, the x-ray unit cell constants (typically 25.00Å–25.05Å) listed in these patents suggest that, in fact, zeolite HP was similar to a mixed Na/K X-type zeolite earlier reported in East German Patent Nos. 43,221 and 58,957. While not listing a unit cell constant, the X-ray d-spacings given by the earlier East German patents indicate a unit cell constant of 25.10Å–25.15Å. In reduced silica faujasite systems, conversion of Na/K forms to the pure Na form (as in the case of HP), results in a reduction of $a_o$ (the unit cell constant) by about 0.10A units, to exactly that reported for the "new" zeolite HP. The East German patents present gross empirical data on the composition of the claimed "Na/K type zeolite", indicating an Si/Al ratio of about 1; however, such estimates are subject to distortion due to inclusion of unreacted silica and/or alumina in the product.

The only clear claim of the preparation of relatively pure powdered "idealized" 1:1 Si/Al faujasite appears in British Pat. No. 1,580,928. In this British patent, a method of preparation of this "reduced silica X-type zeolite" is described wherein alumino-silicate gels are subjected to a multi-day aging period at low temperature, ideally 40° C., followed by crystallization at 60° C.–100° C. at ambient pressure. Attempts to crystallize immediately, without aging as reported in the East German works, failed to give the desired product. The utility of this material as a water softening agent has been demonstrated. In none of the above cases was the preparation of massive bodies of Maximum Alumina X-type zeolite addressed.

With an inate 1:1 Si/Al ratio and known propensity to form zeolite A, meta kaolin would seem a logical base material for the formation of Maximum Aluminum X-type zeolite. Perhaps owing to the discontinuity of Si/Al ratios when the Si/Al ratios of faujasites is lowered to about 1.2 and the inability of extrapolation of standard X-type zeolite reaction mixtures below this ratio, no prior art on the formation of an idealized 1:1 Si/Al faujasite from meta kaolin is known to exist. Using a kaolin based material, in fact U.S. Pat. No. 3,119,660 states "In producing preformed silica rich zeolites such as X and Y . . . additional silica over and above the amount of silica supplied by the reactive kaolin must be provided."

BRIEF DESCRIPTION OF THE INVENTION

It has been discovered that Maximum Aluminum X-type zeolite may be prepared by reaction of preformed macroscopic (>50uM in the largest dimension) meta kaolin aggregates with appropriate alkali metal solutions at relatively low temperatures and pressures. The meta kaolin aggregates do not require any additional sorce of silica or alumina and the resulting Maximum Aluminum X-type zeolite aggregates possess a gross elemental composition virtually identical to the meta kaolin reactant.

The faujasite phase of the resulting zeolite bodies is found to be an idealized 1:1 Si/Al Maximum Aluminum X-type zeolite which by virtue of its uniformly alternating silica and alumina units possesses substantial uniformity of pore size and exceptional homogeneity of cationic sites for adsorption and catalysis.

In the preferred embodiment of the present invention, essentially pure (90%+) self-bound aggregates of Maximum Aluminum X-type zeolite are prepared by the unaged reaction of highly poreformed meta kaolin aggregates with highly alkaline mixed NaOH+KOH solutions at or above 50° C. in 0.5 to 48 hours.

These self-bound Maximum Aluminum X-type zeolite aggregates represent a novel composition. They are substantially uniform, possess maximum site density and wide pores in a highly pure self-bound state essentially free of binder contamination; e.g. a macroscopic monolithic body.

According to another form of the present invention, highly poreformed meta kaolin aggregates are aged in highly alkaline (about 5 M) NaOH+KOH solutions at about 40° C. quiescently for about 5 days and subsequently crystallized at 100° C.

The resulting mechanically rigid aggregates are found to contain about 50%–60% Maximum Aluminum X-type zeolite and ~20% A-type zeolite.

According to still another form of the present inventon, highly poreformed meta kaolin aggregates are converted to zeolite by rapidly circulating highly alkaline solutions of mixed NaOH+KOH through the meta kaolin aggregates during the aging and crystallization period. The resulting mechanically rigid aggregates are found to contain about 70%–80% Maximum Aluminum X-type zeolite and about 15% A-type zeolite.

DETAILED DESCRIPTION OF THE INVENTION

In a co-filed application (Ser. No. 716,426 filed 3-27-85, assigned to the same assignee as the present application), it has been shown that meta kaolin behaves in a qualitatively different manner from the alumino silicate gels used in prior art preparations of reduced silica faujasites. These qualitative differences also are found tbe maintained and accentuated in the preparation of massive bodies of such materials.

Neither East German Pat. No. 43,221, 58,957 nor British Pat. No. 1,580,928 note a beneficial effect for agitation in the formation of reduced silica X-type zeolites from alumino-silicate gels. In fact, the East German works specifically discount any effect of agitation. In the preparation of zeolites A and X from dense meta kaolin bodies, U.S. Pat. No. 3,119,660 states "intensive agitation of the reactant mixture during digestion and crystallization is not necessary . . . in fact excellent results have been achieved under quiescent conditions". It has been found that not only is sufficient agitation beneficial for the formation of Maximum Aluminum X-type zeolite but that sufficient agitation coupled with open, highly poreformed base material is necessary to promote sufficient interaction between the alkaline reactant solution and the meta kaolin aggregates being converted, to form a preponderance of Maximum Aluminum X in the resultant solid masses.

In the synthesis of a 1:1 Si/Al faujasite in the powder form (British Pat. No. 1,580,928), it was claimed that a precrystallitive aging period at less than 50° C. was necessary to prevent high levels of contamination of Zeolite A in the product if aluminosilicate gels are used as the starting reactant. A precrystallitive "digestion" period at or near ambient temperature is claimed to greatly benefit the product purity in meta kaolin pellets converted to a variety of zeolites (U.S. Pat. No. 3,119,660).

Contrary to these teachings, it has been discovered that highly porous meta kaolin aggregates are directly convertible to massive bodies of Maximum Aluminum X-type zeolite in one step without aging or digestion at about 50° C. and slightly higher temperatures.

Finally, it has been discovered that contrary to the prior art, unmodified meta kaolin may be transformed directly and nearly quantitatively to a faujasite phase (Maximum Aluminum X-type zeolite) in the form of massive bodies, without the addition or removal of silica or alumina by chemical means or the conversion of a portion of the alumina to unreactive phases by high temperature treatment.

These massive bodies, in the optimal case, represent the first massive zeolite bodies containing the maximum theoretically possible cationic sites accessible to adsorbate or ion exchange species through wide (about 8Å), absolutely uniform pores.

As used herein, pore-forming materials and processes generally entail the mixing of up to 30% of a "pore-former" with kaolin prior to extrusion of a preform. This pore-former is subsequently removed from the preform, thereby creating voids in the preform. Pore-formers generally include combustible materials such as starch, carbon black, or sawdust, but may also include soluble materials such as salts.

EXAMPLES

The zeolite content of the aggregate tested (in the sodium form) was determined by XRD powder pattern diffractometry by comparison to various pure zeolite standards. Zeolite contents are stated as ranges in that powder pattern intensities vary somewhat with Si/Al ratio. Determination of $a_0$ (unit cell constant) was also established using XRD. Chemical analysis was accomplished using X-ray fluorescence.

Commercial Englehard ASP-400 kaolin was used as the clay source in all cases.

EXAMPLES 1-11 (COMPARATIVE)

In an attempt to combine different aspects of the prior art, 40° C. aging (as suggested by British Pat. No. 1,580,928) of typical X-forming mixtures as specified by U.S. Pat. No. 3,119,660) was attempted. The elemental stoichiometry of meta kaolin dictated that the Si/Al ratio of the mixture was 1.0 rather than 1.25-2.50 as suggested for X formation in U.S. Pat. No. 3,119,660.

The 40° C. aging period was extended from the optimum of 72 hrs. noted in British Pat. No. 1,580,928 to 7 days to compensate for the possibility of lower activity of meta kaolin vs. the gelled alumina silicates of the prior art.

The massive bodies of meta kaolin were prepared by extrusion of ⅛" diameter pellets of kaolin clay by standard techniques followed by calcination at about 700° C., much as taught in U.S. Pat. No. 3,119,660.

In each case, 22.2 g of meta kaolin extrudate was mixed with 22.4 g NaOH and 202 ml H₂O such that:

$SiO_2/Al_2O_3 = 2.0$ $Na_2O/SiO_2 = 1.4$ $H_2O/Na_2O = 40$

Aging quiescently for the specified period followed by crystallization for 8 hrs. at 100° C. yielded:

|  | Aging Period (hours) | Faujasite Content (percent) | A-Zeolite (percent) |
|---|---|---|---|
| Example 1 | 72 | 0 | 40 |
| Example 2 | 88 | 0 | 45 |
| Example 3 | 96 | 5 | 45 |
| Example 4 | 104 | 5 | 40 |
| Example 5 | 112 | 10 | 45 |
| Example 6 | 120 | 10 | 40 |
| Example 7 | 128 | 10 | 45 |
| Example 8 | 136 | 10 | 45 |
| Example 9 | 144 | 10 | 45 |
| Example 10 | 152 | 10 | 50 |
| Example 11 | 168 | 10 | 50 |

These examples (1-11) clearly illustrate that the low temperature precrystallitive aging taught by British Pat. No. 1,580,928 as essential to the formation of "reduced silica X-type zeolite" will not induce significant faujasite formation in unporeformed meta kaolin extrudate in base concentrations taught as appropriate for the formation of-type zeolite using meta kaolin by U.S. Pat. No. 3,119,660.

EXAMPLES 12-22 (COMPARATIVE)

In an additional attempt to combine salient aspects of the prior art, mixed NaOH+KOH, at elevated total base concentration (as suggested in British Pat. No. 1,580,928) was applied to meta kaolin extrudate prepared as above, and the mixture was aged for 3-7 days followed by an 8 hr. 100° C. crystallization.

In each case, 22.2 g of ⅛" meta kaolin extrudate was combined with 39.0 g of NaOH, 18.2 g (anhydrous basis) KOH and 234 ml H₂O such that:

$SiO_2/Al_2O_3 = 2$ $(Na_2O+K_2O)/SiO_2 = 3.25$ $Na_2O/(Na_2O+K_2O) = 0.75$ $H_2O/(Na_2O+K_2O) = 20$

Aging quiescently for the specified period followed by crystallization for 8 hrs. at 100° C. yielded:

|  | Aging Period (hours) | Faujasite Content (percent) | A-Zeolite (percent) |
|---|---|---|---|
| Example 12 | 72 | 5 | 25 |
| Example 13 | 88 | 10 | 30 |
| Example 14 | 96 | 5 | 20 |
| Example 15 | 104 | 0 | 20 |
| Example 16 | 112 | 5 | 25 |
| Example 17 | 120 | 10 | 20 |
| Example 18 | 128 | 5 | 20 |
| Example 19 | 136 | 15 | 25 |
| Example 20 | 144 | 10 | 25 |
| Example 21 | 152 | 10 | 25 |
| Example 22 | 168 | 10 | 20 |

These examples demonstrate that the reactant compositions and aging procedures taught to induce the formation of "reduced silica X-type zeolite" in the powder form may not be used to induce significant formation of faujasite from the massive bodies of meta kaolin as used to prepare a variety of zeolites in U.S. Pat. No. 3,119,660.

In summary, Examples 1-22 demonstrate that the procedures known to produce "reduced silica X-type zeolite" in powder form may not be directly combined with the known procedures to produce massive bodies of X-type zeolite to form massive bodies containing high concentrations of Maximum Aluminum X-type zeolite from meta kaolin.

EXAMPLES 23-33 (COMPARATIVE)

While in no case in the relevant prior art is a high degree of reactant mixing claimed to exert a strong positive effect in "reduced silica X-type zeolite" formation, it was hypothesized that kaolin might behave in a qualitatively different manner from the alumino silicate gels employed to prepare powdered "reduced silica X-type zeolite" or the meta kaolin/silica mixtures used to produce massive bodies of X-type zeolite by the prior art.

In Examples 23-33, 22.2 grams of finely powdered (smaller than 100 mesh) meta kaolin was prepared by crushing and sieving ⅛" meta kaolin extrudate prepared by the methods of the previous examples. This finely powdered meta kaolin was thoroughly mixed with 22.4 g NaOH and 202 ml H₂O such that, as in Examples 1-11:

$SiO_2/Al_2O_3 = 2.0$ $Na_2O/SiO_2 = 1.4$ $H_2O/Na_2O = 40$

These mixtures were aged at 40° C., to promote "reduced silica X-type zeolite" formation as suggested in British Pat. No. 1,580,928 for varying lengths of time and crystallized for 8 hrs. at 100° C. Product analysis yielded:

| | Aging Period (hours) | Faujasite Content (percent) | A-Zeolite (percent) |
| --- | --- | --- | --- |
| Example 23 | 72 | 10 | 70 |
| Example 24 | 88 | 15 | 60 |
| Example 25 | 96 | 10 | 80 |
| Example 26 | 104 | 15 | 75 |
| Example 27 | 112 | 20 | 70 |
| Example 28 | 120 | 15 | 65 |
| Example 29 | 128 | 20 | 70 |
| Example 30 | 136 | 20 | 70 |
| Example 31 | 144 | 20 | 75 |
| Example 32 | 152 | 20 | 75 |
| Example 33 | 168 | 20 | 70 |

While increased reactant mixing increases total zeolite content, again zeolite A predominates if unfortified meta kaolin is employed as the silica-alumina source, confirming the difficulty of converting unmodified meta kaolin to faujasite even if appropriate aging is employed.

EXAMPLE 34-44 (COMPARATIVE)

Noting the higher conversion of meta kaolin to zeolite, although it is undesired A-type, an identical battery of experiments was conducted using reactant compositions similar to Examples 12-22.

In Examples 34-44, 22.2 grams of finely powdered meta kaolin prepared as above were mixed with 39.0 g NaOH, 18.2 g KOH (anhydrous basis) and 234 ml $H_2O$ such that:

$SiO_2/Al_2O_3 = 2.0$ $(Na_2O + K_2O)/SiO_2 = 3.25$ $Na_2O/(Na_2O + K_2O) = 0.75$ $H_2O/(Na_2O + K_2O) = 20$

These mixtures were aged at 40° C., to promote "reduced silica X-type zeolite" formation as suggested in British Pat. No. 1,580,928 for varying lengths of time and crystallized for 8 hrs. at 100? C. Product analysis yielded:

| | Aging Period (hours) | Faujasite Content (percent) | A-Zeolite (percent) |
| --- | --- | --- | --- |
| Example 34 | 72 | 45 | 25 |
| Example 35 | 88 | 45 | 15 |
| Example 36 | 96 | 20 | 5 |
| Example 37 | 104 | 20 | 5 |
| Example 38 | 112 | 70 | 10 |
| Example 39 | 120 | 40 | 30 |
| Example 40 | 128 | 60 | 10 |
| Example 41 | 136 | 75 | 10 |
| Example 42 | 144 | 35 | 5 |
| Example 43 | 152 | 25 | 5 |
| Example 44 | 168 | 35 | 5 |

In these examples, unlike Examples 12-22, faujasite content exceeds A-zeolite content in all cases. However, unlike the known behavior of alumino silicate gels wherein a plateau with aging is reached (100 hrs. maximum aging claimed in British Pat. No. 1,580,928), the data, while scattered, indicates a higher optimum aging period for meta kaolin, with the only samples containing a majority of faujasite in the product occurring at an aging period of 112-136 hours.

EXAMPLES 45-55

In an attempt to increase reactant mixing for massive bodies, small amounts of a poreformer were added to kaolin extrudate as suggested by U.S. Pat. No. 3,119,660. It must be noted that while this has been suggested by the prior art, thorough reactant mixing, even the employment of finely powdered meta kaolin, results in predominately zeolite A if unfortified meta kaolin is reacted with "typical X-forming mixtures" of the prior art.

Ten wt. percent methocel was extruded in $\frac{1}{8}"$ aggregates with kaolin clay. A burnout procedure was conducted by flowing air over the extrudate at 700° C. leaving porous meta kaolin pellets.

In Examples 45-55, 22.2 g of these porous meta kaolin pellets were mixed with 39.0 g NaOH, 18.2 g (anhydrous basis) KOH and 234 cc $H_2O$ such that:

$SiO_2/Al_2O_3 = 2.0$ $(Na_2O + K_2O)/SiO_2 = 3.25$ $Na_2O/(Na_2O + K_2O) = 0.75$ $H_2O/(Na_2O = K_2O) = 20$

These mixtures were aged at 40° C. for varying lengths of time and crystallized for 8 hrs. at 100° C. Product analysis yielded:

| | Aging Period (hours) | Faujasite Content (percent) | A-Zeolite (percent) |
| --- | --- | --- | --- |
| Example 45 | 72 | 25 | 5 |
| Example 46 | 88 | 20 | <5 |
| Example 47 | 96 | 20 | <5 |
| Example 48 | 104 | 20 | <5 |
| Example 49 | 112 | 20 | <5 |
| Example 50 | 120 | 10 | <5 |
| Example 51 | 128 | 10 | <5 |
| Example 52 | 136 | 15 | <5 |
| Example 53 | 144 | 15 | <5 |
| Example 54 | 152 | 15 | <5 |
| Example 55 | 168 | 15 | <5 |

While in no case does the faujasite content exceed about 25 percent, unlike unporeformed pellets (Examples 12-22) the ratio of faujasite/A > 1.

EXAMPLES 56-66

In an attempt to further increase reactant mixing for the preparation of massive bodies, large amounts of porformer were added to kaolin extrudate.

Thirty wt. percent starch was extruded in $\frac{1}{8}"$ aggregates with kaolin clay. A burnout procedure was conducted by flowing air over the extrudate at 700° C. leaving very porous meta kaolin pellets.

In Examples 56-66, 22.2 g of these pellets were mixed with 39.0 g NaOH, 18.2 g (anhydrous basis) KOH and 234 cc $H_2O$ such that:

$SiO_2/Al_2O_3 = 2.0$ $(Na_2O + K_2O)/SiO_2 = 3.25$ $Na_2O/(Na_2O + K_2O) = 0.75$ $H_2O/(Na_2O + K_2O) = 20$

These mixtures were aged at 40° C. for varying lengths of time and crystallized for 8 hrs. at 100° C. Product analysis yielded:

|  | Aging Period (hours) | Faujasite Content (percent) | A-Zeolite (percent) |
| --- | --- | --- | --- |
| Example 56 | 72 | 35 | 25 |
| Example 57 | 88 | 20 | 15 |
| Example 58 | 96 | 35 | 20 |
| Example 59 | 104 | 20 | 15 |
| Example 60 | 112 | 30 | 15 |
| Example 61 | 120 | 35 | 15 |
| Example 62 | 128 | 60 | 15 |
| Example 63 | 136 | 25 | 15 |
| Example 64 | 144 | 35 | 20 |
| Example 65 | 152 | 30 | 15 |
| Example 66 | 168 | 20 | 15 |

Like their powdered meta kaolin equivalents (Examples 34-44), Examples 56-66 demonstrate more faujasite than A zeolite, although total zeolite is generally lower than the analogous powders. Again, unlike the known behavior of gelled alumino silicates, meta kaolin appears to experience an optimal aging precrystallitive period of about 5 days.

While generally lower than analogous powders, faujasite formations are uniformly higher than unporeformed aggregates and poreformed aggregates using smaller amounts of poreformer.

EXAMPLE 67

Attempting to combine the prior art (British Pat. No.,1,580,928) assumption that the aging period at low temperatures induces preferential faujasite nucleation with the present inventors' observation of enhanced reaction by increased reactant mixing, a twenty fold scale up of the mixture of Examples 56-66 was prepared. However, the aging solution was circulated at about 250 cc/min through the bed for the 5 day aging period at 40° C. preceeding subsequent static crystallization. The resulting product was found to be about 60 percent faujasite and 20 percent zeolite A, virtually identical to optimal quiescently aged samples.

EXAMPLE 68

While prior art hypothesis would only suggest benefit by optimizing aging procedures, the effect of reactant mixing during crystallizaion was investigated. Example 67 was repeated with the exception that the reactant circulation was continued through the crystallization period. Results of product analysis revealed about 80 percent faujasite and 15 percent A-zeolite.

While definitive establishment of the Si/Al ratio of less than pure faujasites may be inappropriate by unit cell constant, the composition of mixed phases may be derived if the phases other than faujasite are clearly established. The contaminant in this case is zeolite A which, under these conditions, would be expected to have a Si/Al ratio of about 1.00 and a concomitant aluminum capacity and cation exchange capacity of about 7.04m equiv./g on an anhydrous basis. Maximum Aluminum X-type zeolite, empirically identical to zeolite A (although structurally quite different), would be expected to have the same aluminum content and cation exchange capacity if in the same cationic form.

A sample of the highly crystalline product of Example 68 was repeatedly subjected to calcium exchange and subjected to chemical analysis by X-ray fluorescence. A gross-Si/Al ratio of the zeolite bodies of 1.015 and a cation exchange capacity of 6.98m equiv./g was established. This is consistent with a highly crystalline Maximum Aluminum X-type +A bodies and not consistent with standard X+A bodies, strongly inferring the faujasite phase is Maximum Aluminum X-type zeolite. It should be noted that this gross elemental technique for the establishment of product was deemed adequate for identification in British Pat. No. 1,580,928.

EXAMPLE 69

Extensive work on the formation of powdered Maximum Aluminum X-type zeolite from meta kaolin in forms suitable for detergent builders, reported in the co-filed application referred to above, resulted in the discovery that essentially pure Maximum Aluminum X-type zeolite could be prepared in one step without aging, at a temperature of 50° C. or slightly greater.

A mixture identical to Examples 67 and 68 was prepared and reacted under constant circulation at about 50° C for a period of 10 days. The resultant product was found to have (as was the case in all prior examples) significantly different X-ray diffraction pattern intensities on a line per line basis (compared to standard X-zeolite) however, the summation of all major peaks yielded total intensities which were virtually identical.

Gross elemental analysis by XRF indicated that the solid faujasite aggregates possessed a Si/Al ratio of about 0.994 and a calcium exchange capacity of about 7.03 m equiv. per gram (compare to the expected 7.04 m equiv/g expected for absolutely pure Maximum Aluminum X-type zeolite). No solid zeolite aggregates of a wide pore variety, of any kind, are found with this high a cation capacity in the prior art.

Definitive determination of Si/Al ratio, including X-ray unit cell constant is possible, if a relatively pure sample is available. A unit cell constant of about 25.02 Å would be anticipated for a perfect 1:1 Si/Al faujasite. The product of Example 69 was found (in the sodium form) to demonstrate a unit cell constant of 25.03, inferring Si/Al of approximately 0.99.

The combination of gross elemental analysis, cation exchange capacity and XRD information conclusively demonstrate that the product of Example 69 is an essentially pure body of Maximum Aluminum X-type zeolite.

The prior art on the production of "Reduced Silica" X-type zeolites is devoid of mention of seeding as a mechanism to induce nucleation of appropriate alumino silicate gels and to thereby eliminate the extended aging period practiced in British Pat. No. 1,580,928. It has now been discovered (as described in co-filed application Ser. No. 716,426 filed 3-27-85), however, that appropriate alumino silicate gels may be seeded to induce the rapid formation of Reduced Silica X-type zeolites without the induction period required in prior art practices.

EXAMPLE 70—Control

In a manner analogous to the methodology employed in the '928 patent, 23.5 grams of 50% aqueous NaOH was employed to solubilize 19.9 grams Al(OH)$_3$ (59.8% Al$_2$O$_3$). In a separate container, 56.5 grams NaOH 50% aqueous solution was diluted with 179 cc deionized water. To this solution was added 21.2 grams (anhydrous based) KOH and 48.9 grams sodium silicate (8.9% Na$_2$O, 28.7% SiO$_2$). The two solutions were combined under agitation (at approximately 700 RPM), heated in a steam bath at 75° C. and left to react for four hours. The reaction mixture had the following overall composition:

$SiO_2/Al_2O_3 = 2.0$ $(Na_2O+K_2O)/SiO_2 = 3.25$ $Na_2O/(Na_2O+K_2O) = 0.75$ $H_2O/(Na_2O+K_2O) = 20$

Following filtration drying, the product was found to be essentially non-crystalline.

In principle, if nucleation were the key step in the formation of Reduced Silica X-type zeolite, seeding with any faujasitic zeolite at the appropriate point in the reaction would direct the synthesis toward the desired species. With clay-derived starting materials, using an equilibration or delay period, seeding is necessary to induce the formation of pure product.

EXAMPLE 71 —(Comparative)

On the hypothesis that the equilibration period could be markedly reduced for presolubilized alumino silicate gels, immediate seeding of the reaction mixture was attempted.

A mixture identical to that used in Example 70 was prepared. Immediately after the reactants were combined, one gram of clay-derived Maximum Aluminum X-type zeolite was added with stirring and the seeded mixture was allowed to crystallize at 75° C. for four hours.

Analysis of the product indicated a highly crystalline phase which was estimated to be approximately 95% zeolite of the faujasite family by XRD powder pattern diffractometry. The relative intensities of the XRD powder pattern peaks were reminiscent of standard (as opposed to Maximum Aluminum) X-type zeolite and immediately and obviously differntiatable from Maximum Aluminum X-type zeolite.

Elemental analysis of this composition yielded a gross ratio Si/Al = 1.04, well within the range of "Reduced Silica" X-type zeolite as taught by Kuhl and Sherry. Elemental analysis of the exchangeable cationic content of the sample (sodium, potassium, calcium, magnesium) balanced with the aluminum content of the zeolite such that eq. cation/eq. aluminum =0.99+ indicating that essentially all the aluminum present in the sample was present within the crystalline phase. Thus, the Si/Al ratio of 1.04 represented a maximum for the zeolite phase and the true Si/Al ratio was less than or equal to 1.04.

An XRD unit cell constant ($a_0$) for this material of 25.03 Å was established and indicates an Si/Al ratio of approximately 1.0. Noting the XRD indication of faujasite content and the elemental ratios, combined with the reactant sources, it must be concluded that this material is the LSX previously disclosed in the '928 patent, and that seeding at elevated temperatures reduces the necessary preparaon time by a full order of magnitude or more.

However, while the XRD pattern of both LSX and Maximum Aluminum X-type zeolites clearly indicate that they are both members of the faujasite family of zeolites, (similar to the case of zeolites X and Y) qualitative differences in the spectrum clearly differentiate these species. This difference in XRD spectrum is clear from the comparative ordering of the strongest peak intensities of LSX and Maximum Aluminum X-type zeolite as listed below.

| Order of XRD Peak Intensities | LSX (Associated Miller Index) (hkl) | MAX* (Associated Miller Index) (hkl) |
|---|---|---|
| 1 | 111 | 111 |
| 2 | 533 | 751 |
| 3 | 751 | 642 |
| 4 | 642 | 533 |
| 5 | 220 | 331 |

*Maximum Aluminum X-type zeolite

These conspicuous differences, combined with the equivalence of these materials on an elemental and unit cell constant basis, indicate that these materials represent related but different zeolite species (analogous to the related faujasites X and Y).

STATEMENT OF INDUSTRIAL UTILITY

The zeolitic bodies produced in accordance with the present invention exhibit commercially useful properties of selective adsorption, ion exchange, and catalysis.

While this invention has been described with reference to specific examples, it is intended that the scope of the invention be defined as broadly as possible within the spirit of the invention. In accordance with that aim, the following claims are presented.

We claim:

1. A macroscopic monolithic body of self-bound zeolite comprising substantially Maximum Aluminum X-type zeolite.

2. The body of claim 1 wherein said body is also comprised of at least some A-type zeolite and contains at least as much Maximum Aluminum X-type zeolite as it contains A-type zeolite.

3. The body of claim 2 wherein said body contains at least nine times as much Maximum Aluminum X-type zeolite as it contains A-type zeolite.

4. A process for making self-bound monolithic bodies of Maximum Aluminum X-type zeolite from kaolin preforms including the steps of:
   (a) extruding a mixture, including kaolin and from 10 to 30% of a pore-forming material into a preform body;
   (b) removing substantially all of said pore-forming material from said preform, thereby creating voids wihin said body;
   (c) heating said body to a temperature above 600° C. for a period of sufficient duration to permit substantially complete conversion of said kaolin to meta kaolin;
   (d) placing said body in an aqueous solution of NaOH and KOH such that the solution has an overall composition in the range:

$(Na_2O+K_2O) / SiO_2 = 2.0-5.0$ $Na_2/(Na_2O+K_2O) = 0.10-0.90$ $H_2O/(Na_2O+K_2O) = 5-50$ (e) crystallizing in situ zeolites in said body with agitation at a temperature at or above 50° C. for a period of from 0.5 hours to 48 hours.

5. The process of claim 4 wherein said solution containing said body of step (d) is aged at a temperature below 50° C. for a period of from 20 hours to 200 hours.

6. The process of claim 5 wherein the aging period is carried out with agitation.

* * * * *